United States Patent
Skwiercz et al.

(10) Patent No.: US 6,682,673 B1
(45) Date of Patent: Jan. 27, 2004

(54) METHOD FOR PRODUCING FIBER REINFORCED MATERIALS

(75) Inventors: Michael Skwiercz, Langenfeld (DE); Bernhardt Gutsche, Hilden (DE); Frank Roessner, Oldenburg (DE); Doris Elberfeld, Wilster (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 30 days.

(21) Appl. No.: 10/030,037

(22) PCT Filed: Jun. 7, 2000

(86) PCT No.: PCT/EP00/05937

§ 371 (c)(1),
(2), (4) Date: Jun. 24, 2002

(87) PCT Pub. No.: WO01/02469

PCT Pub. Date: Jan. 11, 2001

(30) Foreign Application Priority Data

Jul. 3, 1999 (DE) .......................................... 199 30 770

(51) Int. Cl.$^7$ ................................................ D04H 1/64
(52) U.S. Cl. ..................... 264/128; 264/345; 264/347; 264/109; 502/401; 523/222
(58) Field of Search .................... 427/389.8, 389.9; 264/109, 128, 345, 347; 502/401; 523/222

(56) References Cited

U.S. PATENT DOCUMENTS

| | | | |
|---|---|---|---|
| 4,393,020 A | * 7/1983 | Li et al. ...................... 264/108 |
| 5,302,670 A | 4/1994 | Frische et al. |
| 5,728,824 A | 3/1998 | Narayan et al. |
| 5,948,706 A | 9/1999 | Riedel et al. |
| 5,977,014 A | * 11/1999 | Plischke et al. ............ 502/401 |
| 6,210,523 B1 | 4/2001 | Schmidt et al. |

FOREIGN PATENT DOCUMENTS

| | | |
|---|---|---|
| DE | 40 19 087 | 1/1991 |
| DE | 40 24 364 | 2/1991 |
| DE | 41 19 295 | 12/1992 |
| DE | 196 44 017 | 5/1998 |
| DE | 196 47 671 | 5/1998 |
| DE | 198 34 048 | 2/2000 |
| EP | 0 518 338 | 12/1992 |
| EP | 0 634 433 | 1/1995 |
| EP | 0 687 711 | 12/1995 |

OTHER PUBLICATIONS

Kohler et al., "Nutzen wir das Potential der Naturfasern," in: Gülzower Fachgespräche, Naturfaserverstaerkte Kunststoffe, (Ed. Fachagentur Nachwachsende Rohstoffe), pp. 95–100, Gülzow, 1995.

Müller, C. F., "Leitfaden Nachwachsende Rohstoffe, Anbau, Verarbeitung Produkte," 1$^{st}$ Edition, Chapter 8, pp. 93–113, Heidelberg, 1998.

Mülhaupt, et al., "Polyester Networks Based Upon Epoxidized and Maleinated Natural Oils," Die Angewandte Makromolekulare Chemie, vol. 249, pp. 79–92, 1997.

* cited by examiner

Primary Examiner—Merrick Dixon
(74) Attorney, Agent, or Firm—John E. Drach; Steven J. Trzaska

(57) ABSTRACT

A process for making a fiber composite involving: (a) providing a natural fiber; (b) providing a matrix material produced by a radical polymerization reaction of: (i) a monomer selected from the group consisting of ring opening products of epoxidized fatty compounds with olefinically unsaturated carboxylic acids, and (ii) a comonomer selected from the group consisting of olefinically unsaturated carboxylic acids; (c) providing a radical initiator; and (d) conducting the radical polymerization reaction of (i) and (ii) in the presence of the natural fiber so that the matrix material envelops the natural fiber, thus producing the fiber composite.

7 Claims, 1 Drawing Sheet

METHOD FOR PRODUCING FIBER REINFORCED MATERIALS

BACKGROUND OF THE INVENTION

This invention relates to a fiber-based composite material, to a process for the production of fiber-based composite materials and to the use of these materials for the production of consumer articles.

Fiber composites consist at least of fibers and a matrix material. The function of the fibers is to strengthen the material. More particularly, the fibers absorb tensile forces acting on the material while the matrix fills voids between the fibers and coats the fibers. The matrix thus transmits the shear forces acting on the composite material. In addition, the matrix protects the coated fibers from outside influences such as, for example, the penetration of water or moisture, oxidative or photo-oxidative influences. Known fiber composites include, for example, glass-fiber-, metal-fiber- or carbon-fiber-reinforced plastics. By virtue of their high strength, durability and reproducibility, composites such as these have hitherto been successfully used in many fields. However, in view of the need for sustainable development, products based on biomass and/or agricultural products as renewable raw materials have also been increasingly in demand for composite materials. In contrast to petrochemical and fossil raw materials, renewable raw materials are never exhausted and, through the cultivation of new plants, can be regenerated at any time by photosynthesis.

Plastics reinforced by natural fibers are known per se. Their advantages over glass-fiber-reinforced plastics in regard to raw material base, ecobalance, safety at work, weight and thermal disposal have already been described, cf. for example Kohler, R.; Wedler, M.; Kessler, R.: "Nutzen wir das Potential der Naturfasern?" in: Gülzower Fachgespräche "Naturfaserverstärkte Kunststoffe" (Ed. Fachagentur Nachwachsende Rohstoffe, Gülzow 1995), pages 95–100, and "Leitfaden Nachwachsende Rohstoffe, Anbau, Verarbeitung, Produkte", 1st Edition, Heidelberg: Müller, 1998, more particularly Chapter 8. The matrixes used may be divided into thermoplastic and thermoset systems. Systems with thermoplastic matrixes based on renewable raw materials are known. Thus, EP-A-687 711 describes a fibre composite of biodegradable fibers and a matrix of biodegradable material. Cellulose acetate, lignin, starch and starch derivatives are proposed as suitable thermoplastic materials for the matrix. Products such as these have been found to be unsatisfactory in regard to processability, mechanical properties in important applications and price.

DE-A-196 47 671 describes a fiber composite with a fibrous material for reinforcement and a matrix material based on shellac. The matrix material may contain a crosslinking agent. The main disadvantage of this thermoset matrix material is the very limited availability of shellac.

Other thermoset systems available at the present time are mainly polymer systems of which the raw materials are very largely petrochemical in origin (polyurethanes, epoxy resins, polyesters, etc.). In the field of polyurethanes, some proposals have been put forward with a view to developing native-based raw materials. For example, EP-A-634 433 proposes reaction products of a polyester obtainable by self-condensation of ricinoleic acid with an aromatic polyisocyanate as binders for the production of composite materials.

In addition, DE-A41 19 295 proposes an ecofriendly composite material of natural fibers and plastics of the polyurethane-polyester and/or polyurethane-polyamide type which contain hydroxyfunctional natural fatty acids of unchanged length or derivatives thereof.

In "Angewandte makromolekulare Chemie" 249 (1997), pages 79 to 92, R. Mülhaupt, D. Hoffmann, S. Lawson and H. Warth describe flexible, semiflexible and rigid polyester networks based on maleinized oils of vegetable oils, such as soybean, rapeseed and linseed oil, as anhydride-functional hardeners with epoxy resins based on bisphenol A/diglycidyl ether or epoxidized vegetable oils. They also describe unsaturated polyester resins based on maleic anhydride, epoxidized vegetable oils and styrene which may optionally be reinforced with natural short fibers, such as flax or hemp. The processability of such resins by existing processing machines is not discussed.

Factors of paramount importance in the development of composite materials besides the choice of ecologically safe renewable raw materials are, of course, the mechanical properties of those materials including, in particular, high tensile strength.

The problem addressed by the present invention was to provide composite materials in which both the reinforcing materials and the matrix materials would be largely based on renewable raw materials and which would have improved mechanical properties in relation to known materials.

It has surprisingly been found that, with materials based on renewable raw materials, it is possible by limiting the quantities of fibers used, based on the matrix material, to obtain materials which have advantageous mechanical properties.

DETAILED DESCRIPTION OF THE INVENTION

Figure 1:
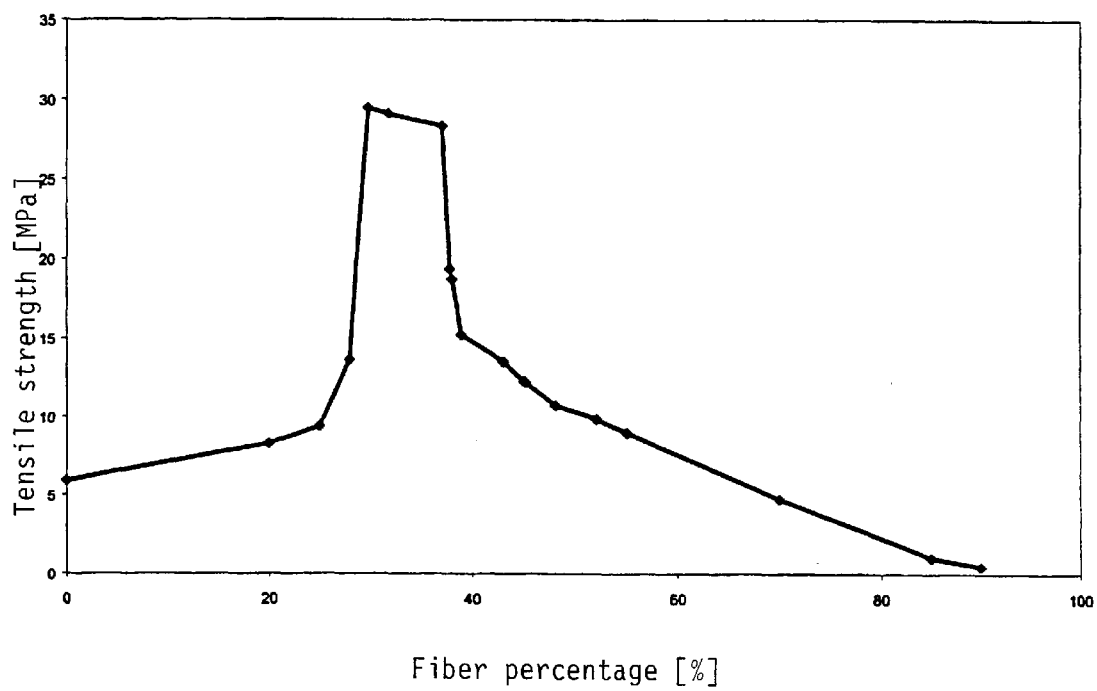
FIG. 1 is a line graph representing tensile strength for pressing conditions at 200° C., 10 minutes and 30 bar which shows the maximum tensile strength being 30 MPa at a fiber percentage of 30%.

In a first embodiment, the present invention relates to a process for the production of fiber composites based on natural fibers and a matrix material, the matrix material being produced by radical polymerization from the monomers a) and at least one comonomer b) and the monomers a) being selected from the group of ring opening products of epoxidized fatty compounds with olefinically unsaturated carboxylic acids and the comonomers b) being selected from the group of olefinically unsaturated carboxylic acids, characterized in that the polymerization reaction is carried out in the presence of 25 to 45% by weight of the fibers, based on the weight of the matrix material, and at temperatures of 100 to 200° C.

The monomers a) are known compounds and are selected from the group of epoxidized fatty compounds ring-opened with carboxylic acids. The epoxidized fatty compounds are obtained by reacting suitable starting materials with ethylene oxide. Examples of preferred starting materials are the natural fats and oils of rape, sunflowers, soya, flax, hemp, castor oil, coconuts, oil palms, oil palm kernels and olive trees. It is of particular advantage to use epoxidized soybean oil which preferably contains 5 to 10% by weight of epoxy groups. The reaction of the epoxidized fatty compounds with olefinically unsaturated carboxylic acids takes place on the lines of a nucleophilic ring opening reaction at the epoxide ring of the fatty compounds. The carboxylic acids are preferably selected from the group of unsaturated $C_{3-10}$ carboxylic acids, namely acrylic acid, methacrylic acid, crotonic acid, itaconic acid, maleic acid, fumaric acid. Monomers a) obtained by ring opening of epoxidized fatty compounds with acrylic acid are particularly preferred. Monomers a) of soybean oil epoxide ring-opened with acrylic acid are particularly preferred. In the reaction of the epoxides with the carboxylic acids, it is of advantage to use an excess of olefinically unsaturated carboxylic acid in order to achieve a complete reaction. The reactants are preferably used in a molar ratio of ca. 1:2 (epoxide:acid). The ring opening reaction takes place at elevated temperatures of 100 to 200° C. and, depending on the reactivity of the acid component, may even be carried out in the absence of a catalyst. The polymerization preferably takes place at temperatures of 130 to 200° C. and more particularly at temperatures of 150 to 180° C. If necessary, however, known alkaline or acidic catalysts may be added to accelerate the reaction. Where highly reactive carboxylic acids, such as acrylic acid, are used, it can be of advantage to prevent condensation of the acids with one another by addition of suitable inhibitors, for example hydroquinone or p-benzoquinone. In that case, the inhibitor is added in quantities of 1 to 20% by weight, based on the weight of carboxylic acid.

In the process according to the invention, the monomers a) are processed together with the fibers to form the required workpieces, preferably in a mold at elevated temperature in the presence of at least one comonomer b). However, processing may also be carried out by the so-called hand lamination method. In either case, a radical polymerization takes place between the monomers a) and b) and leads to curing of the basically thermoset starting component a). In this reaction, the unsaturated parts of the monomers a) and b) react with one another which results in hardening of the material. The matrix envelops the fibers and thus leads to the formation of a stable material. In the production of fiber composites, it can be of advantage to react the fibers and matrix material under elevated pressure. In this case, the pressure in the process according to the invention is typically between 20 and 200 bar and preferably between 20 and 60 bar. The reaction times for the polymerization are preferably between 30 seconds and about 20 minutes and more particularly between 1 and 5 minutes.

The comonomers b) contain at least one olefinic unsaturated double bond and are preferably selected from the group of acrylic acid and derivatives thereof, such as methacrylic acid. Generally, alkyl methacrylic acids corresponding to general formula (I):

(I)

in which R is an alkyl group containing 1 to 22 carbon atoms, are suitable. However, several comonomers b) may also be subjected to radical polymerization in admixture with the monomers a). In this case, 1 to 10% by weight, preferably 2 to 6% by weight and more particularly 2 to 4% by weight—based on the weight of comonomers a)—of comonomers b) are used.

Besides the above-described representatives of the comonomers b), other compounds, preferably from the group consisting of the derivatives of acrylic, methacrylic and alkyl acrylic acid, more particularly esters thereof with $C_{1-30}$ alcohols, preferably $C_{10-22}$ alcohols, and generally allyl esters or vinyl esters, such as vinyl acetate, vinyl propionate or vinyl versatate, vinyl laurate or styrene, divinyl benzene or mixtures thereof, may also be used.

Radical initiators, such as organic peroxides, for example t-butylper-3,5,5-trimethyl hexanoate (TBPIN), are added in known manner for the reaction with the monomers a). At elevated temperatures (>160° C.), these radical initiators decompose and, in doing so, start the actual polymerization reaction. Now, the process according to the invention is characterized in that certain quantities of fibers are reacted together with the monomers and form a hard material in the manner described above. The present technical teaching makes use of the surprising fact that materials having maximal tensile strength are only obtained with selected small amounts of fibers. In contrast to the obvious assumption that a large percentage of fibers in the material would also lead to improved tensile strength, it has been found that high tensile materials, i.e. materials with tensile strengths of 20 MPa or higher, are only obtained where 20 to 45% by weight of fibers, based on the matrix material of the monomers a) and comonomers b) are used in the present process. In one particularly preferred embodiment, the quantity of fibers used is limited to 30 to 40% by weight, based on the quantity of components a) and b). The extraordinary strength achieved with the selected quantity range of fibers can be demonstrated by the non-limiting FIG. 1.

Other auxiliaries known per se, including flameproofing agents, pigments, UV absorbers and organic and/or inorganic fillers, may also be added to the composite materials. Suitable inorganic fillers are natural and synthetic silicas (Aerosil types, including hydrophobicized forms, Amosil types, zeolites, such as Sasil and Flavith D (odor absorbers made by Degussa), silicate-containing hollow microbeads (Fillite made by Omya) and natural silicates, such as bentonites, montmorillonites, talcum, kaolinite and wollastonite. Suitable pigments are, for example, calcium carbonate, calcium sulfate, barium sulfate, titanium dioxide and carbon black. Various types of carbon black (furnace blacks, gas blacks, for example Printex 60 of Degussa) color the structural component black, even in low concentrations, and protect it against UV radiation. The auxiliaries are used in concentrations of 0.1 to 5% by weight. Organic fillers are, for example, starch and starch derivatives, wheat proteins, cellulose powder and chitin/chitosan powder.

Although the oleochemical matrixes mentioned above may also be processed with synthetic fibers, such as glass fibers, carbon fibers, metal fibers and the like to form fibre composites, natural fibers are preferably used in accordance with the invention. These natural fibers may be used in the form of short fibers, yarns, rovings or preferably sheet-form textiles in the form of nonwovens, needle-punched nonwovens, random laid nonwovens, woven fabrics, laid fabrics or knitted fabrics based on flax, hemp, straw, wood wool, sisal, jute, coconut, ramie, bamboo, bast, cellulose, cotton or wool fibers, animal hair or fibers based on chitin/chitosan and combinations thereof.

The present invention also relates to fiber composites containing a fiber material and a matrix material based on a radical polymer of a) epoxidized fatty compounds ring-opened with olefinically unsaturated carboxylic acids with at least one olefinically unsaturated comonomer b), the fiber material being present in a quantity of 25 to 45% by weight, based on the weight of the matrix material. The fiber composite preferably has a maximum tensile strength of 20 to 35 MPa and a density of 0.1 to 1.0 g/cm³ and preferably in the range from 0.1 to 0.8 g/cm³.

The fiber composites according to the invention may be processed to mouldings by any of the known methods. One feature common to all these known methods for the production of moldings is that the starting materials, fiber and matrix, are combined to form a molding composition which cures on, in or between solid molds to form a composite material. The fiber starting material is introduced into an uncured matrix of the thermoset and, by compression, is completely wetted and coated with this still low-viscosity thermoset resin. Accordingly, the nature of the fibrous material to be introduced critically determines the production method to be used.

The present invention also relates to the use of the composite materials according to the invention for the production of structural components for vehicle manufacture, i.e. for the manufacture of cars, railway vehicles and aircraft and for the production of bodywork parts and interior trim. The composite materials according to the invention may also be used in the construction industry as insulating materials, sandwich elements and the like, in window manufacture for making window frames, door frames and doors, in the furniture industry for the production of panels, furniture parts and furniture, in the electronics/energy industry for the production of computers, domestic appliances, housings, blades for fans or wind energy installations. In the leisure industry and in the field of sports, sports equipment, boats, gliders and toys can be made from the composite materials according to the invention; in machine construction, they may be used for the manufacture of gearwheels or gear components; in waste management, they may be used for the manufacture of garbage containers. In plant manufacture, vessels, pumps and tube elements can be made from the composite materials according to the invention; in the packaging industry, the materials according to the invention may be used for the production of bottles, containers, moldings and technical packaging. Finally, the composite materials according to the invention may be used in agriculture for the production of containers, feed silos, plant pots and, in safety field, for the production of safety helmets.

EXAMPLES

Production of Ring Opening Product Based on Epoxidized Soybean Oil 10 kg of soybean oil epoxide (epoxide content 6.6% by weight) were stirred at 120° C. and 5.9 g of acrylic acid and 637 g of p-benzoquinone were then uniformly added. The mixture was stirred for a total of 6 hours and was then cooled to 90° C. The soybean oil epoxyacrylate thus obtained was a golden yellow viscous oil.

Production of a Prepreg of the Fibre Composite According to the Invention 305 g of soybean oil epoxyacrylate were mixed with 12.2 g of acrylic acid (4% by weight) and 6.1 g TBPIN peroxide (2% by weight) and various quantities of a flax fiber random laid nonwoven and distributed over a plate with a length of 20 cm, a width of 10 cm and an edge height of 3 mm. The whole hardened in a recirculating air oven at 200° C. after a pressing time of 10 minutes under a pressure of 30 bar.

The fiber component was varied from 0 to 90% by weight. In FIG. 1, the tensile strength of the test specimens is plotted against the percentage quantity of fibers. It can be seen that maximum tensile strength is surprisingly achieved with a fiber percentage of 25 to 45% by weight.

Another prepreg was produced as described above. The fiber percentage was 34% by weight. An acrylic acid/methacrylic acid mixture (2:2% by weight) was used. The tensile strength measured 30 MPa.

Another experiment involved a matrix of soybean oil epoxide with 2% by weight acrylic acid and 2% by weight methacrylic acid. The fiber percentage was 34% by weight. A pressure of 30 bar was applied for 1 minute at a temperature of 153° C. The tensile strength measured 22 MPa.

What is claimed is:

1. A process for making a fiber composite comprising:
   (a) providing a natural fiber;
   (b) providing a matrix material produced by a radical polymerization reaction of:
      (i) a monomer selected from the group consisting of ring opening products of epoxidized fatty compounds with olefinically unsaturated carboxylic acids; and
      (ii) a comonomer selected from the group consisting of olefinically unsaturated carboxylic acids.
   (c) providing a radical initiator; and
   (d) conducting the radical polymerization reaction of (i) and (ii) in the presence of the natural fiber so that the matrix material envelops the natural fiber, thus producing the fiber composite.

2. The process of claim 1 wherein the natural fiber is present in an amount of from about 25 to 45% by weight, based on the weight of the matrix material.

3. The process of claim 1 wherein the radical polymerization reaction is carried out at a temperature of from about 100 to 200° C.

4. The process of claim 1 wherein the radical polymerization reaction is carried out at a pressure of from about 20 to 200 bar.

5. The process of claim 1 wherein the radical polymerization reaction is carried out at a temperature of from about 130 to 200° C.

6. The process of claim 1 wherein the natural fiber is present in an amount of from about 25 to 40% by weight, based on the weight of the matrix material.

7. The process of claim 1 wherein the comonomer is employed in an amount of from about 1 to 10% by weight, based on the weight of the monomer.

* * * * *